United States Patent [19]

Yamazaki

[11] Patent Number: 5,206,034
[45] Date of Patent: Apr. 27, 1993

[54] INJECTION MOLDING MACHINE HAVING AN ANNULAR LOAD CELL

[75] Inventor: Shin Yamazaki, Nagano, Japan

[73] Assignee: Nissei Jushi Kogyo K.K., Nagano, Japan

[21] Appl. No.: 731,248

[22] Filed: Jul. 17, 1991

[30] Foreign Application Priority Data

Jul. 18, 1990 [JP] Japan ................................ 2-190104

[51] Int. Cl.$^5$ ............................................. B29C 45/77
[52] U.S. Cl. ................................... 425/145; 264/40.5; 425/149; 425/170
[58] Field of Search ............... 425/145, 149, 170, 171, 425/135; 264/40.1, 40.3, 40.5

[56] References Cited

U.S. PATENT DOCUMENTS

| | | | |
|---|---|---|---|
| 4,879,077 | 11/1989 | Shimizu et al. | 425/145 |
| 4,950,144 | 8/1990 | Watanabe et al. | 425/135 |
| 4,950,146 | 8/1990 | Adachi | 425/149 |
| 4,961,696 | 10/1990 | Yamamura | 425/149 |
| 5,129,808 | 7/1992 | Watanabe et al. | 425/145 |

Primary Examiner—Tim Heitbrink
Attorney, Agent, or Firm—Sughrue Mion Zinn Macpeak & Seas

[57] ABSTRACT

An injection molding machine includes a guide coupling for transmitting a linear movement of a ball screw mechanism, and a screw coupling for transmitting rotary movement. A washer-type load cell including an inner tubular portion having first and second ends, an outer tubular portion, and an intermediate distortion portion, is positioned between the guide coupling and the screw coupling to detect a pressure applied to the screw coupling. The inner tubular portion of the load cell and a pair of bearing portions positioned at the first and second ends of the inner tubular portion are secured to the screw coupling by a bearing nut, and the outer tubular portion of the load cell is secured to the guide coupling. This arrangement allows screw pressure to be applied to the inner tubular portion through both the screw coupling displacing relative to the guide coupling and the bearing portion, while the outer tubular portion is positioned-regulated by the guide coupling. The output of the load cell is unaffected by either predetermined loads caused by initial tightening of the structure or the guide coupling, and is proportional to the screw pressure.

14 Claims, 5 Drawing Sheets

INJECTION MOLDING MACHINE HAVING AN ANNULAR LOAD CELL

BACKGROUND OF THE INVENTION

The invention relates to an injection molding machine having a built-in load cell for detecting pressure applied to a screw.

Generally, electrically driven injection molding machines have a built-in load cell inside a screw drive mechanism to detect pressure to be applied to a screw. FIGS. 6 and 7 show the construction of a main portion of a conventional injection molding machine having a built-in load cell.

As shown in FIG. 6, an injection molding machine 60 has a guide coupling 53 which is slidably supported by a plurality of guide shafts 51 and to which linear movements from a ball screw mechanism 52 are transmitted. The machine 60 also includes a screw coupling 54 which is coupled to a rear end of a screw 55 and to which rotary movements are transmitted. The screw coupling 54 is rotatably supported by the guide coupling 53. Additionally, a washer-type load cell (e.g., pressure detector) 61, which includes an inner tubular portion 62, an outer tubular portion 63, and an intermediate distortion portion 64, is interposed between the screw coupling 54 and the guide coupling 53. The load cell 61 and the guide coupling 53 are secured to the screw coupling 54 by a bearing nut 56, together with a thrust bearing 58 and an angular ball bearing 59, both bearings 58, 59 interposing the load cell 61 and the guide coupling 53 therebetween.

With this arrangement, once pressure from the screw 55 is applied to the inner tubular portion 62 through the screw coupling 54 and the thrust bearing 58, the intermediate distortion portion 64 generates distortion which corresponds to the applied pressure because the outer tubular portion 63 is regulated by the guide coupling 53. This pressure is detected by distortion gages mounted on the intermediate distortion portion 64.

However, in the conventional injection molding machine 60, the torque of the bearing nut 56 acts on the outer tubular portion 63 through the intermediate distortion portion 64, thereby causing an initial distortion to be generated on the load cell 61, and the bearing height of the thrust bearing 58 and the thickness of the load cell 61 are decreased with an increasing injection force. As a result, a predetermined load or pre-load applied from the bearing nut 56 to the angular ball bearing 59 is decreased proportionally to such a decrease, thereby impairing linearity in the detection characteristic (output characteristic) of the load cell 61 corresponding to the magnitude of the injection force. Hence, pressure is incorrectly detected, and thus making corrections thereof is difficult.

Additionally, deviations from the zero point are caused not only by reversible variations in the pre-load applied from the bearing nut 56 due to changes caused by, for example, temperature variations and different thermal expansion coefficients among materials, but also by irreversible variations in the pre-load caused by the slackening of the bearing nut 56 due to repeated use. Such deviations reduce detection accuracy, reliability, and the like.

FIG. 7 shows an injection molding machine 70 (based on Japanese Kokai No. 27921/1989) in which the above conventional shortcomings are overcome. For clarity, the parts and components in FIG. 7 identical to those in FIG. 6 are designated by the same reference numerals. Injection molding machine 70 is constructed so that the load cell 61 is interposed between the guide coupling 53 and a ball nut 57 of the ball screw mechanism 52. With this arrangement, the influence of the pre-load applied from the bearing nut 56 is eliminated.

However, even though the injection molding machine 70 is free from the influence from the pre-load described above, the machine is affected by the frictional resistance of the guide coupling 53 and the like. That is, although the guide coupling 53 is supported slidably by the guide shafts 51, frictional and other error factors attributable to the guide shafts 51 exist, i.e., variable error factors such as thermal expansion coefficients and fixed error factors such as machining accuracy and parallelism during assembly of the guide shafts. Thus, the magnitude of friction also varies depending on the position of the guide coupling 53 and the elapsed time from the start of operation. As a result, the injection molding machine 70, like other conventional machines, suffers in its detection accuracy.

Further, the installation of the load cell 61 outside the guide coupling 53 requires a mounting screw hole, thereby making the load cell 61 unnecessarily large.

SUMMARY OF THE INVENTION

In view of the foregoing and other problems associated with the conventional systems, an object of the invention is to provide an injection molding machine which accurately detects pressures and which is not affected by the pre-load due to the bearing nut being tightened or by the guide coupling.

As shown in FIG. 1, the invention resides in an injection molding machine 1 which comprises: a guide coupling 2 for transmitting a linear movement of a ball screw mechanism; a screw coupling 3 for transmitting a rotary movement; and a washer-type load cell 4 which includes an inner tubular portion 5, an outer tubular portion 6, and an intermediate distortion portion 7, and which is disposed between the screw coupling 3 and the guide coupling 2 to detect pressure applied to the screw coupling 3. The guide coupling 2 rotatably supports the screw coupling 3. An inventive feature includes the inner tubular portion of the load cell 4 and a pair of bearing portions 9, 10, disposed at both ends of the inner tubular portion 5, being secured to the screw coupling 3 by a bearing nut 11. The outer tubular portion 6 of the load cell 4 is secured to the guide coupling 2. A thrust bearing 9s may be employed as the bearing portion 9 disposed between the inner tubular portion 5 and the screw coupling 3, while an angular ball bearing 10s may be employed as the bearing portion 10 disposed between the inner tubular portion 5 and the bearing nut 11. The outer tubular portion 6 may be secured by being clamped between a bearing case 12 securing the bearing portion 9 and the guide coupling 2, or may be secured to the guide coupling 2 by mounting screws 13.

According to the inventive injection molding machine 1, the bearing portions 9, 10 and the inner tubular portion 5 of the load cell 4 are secured to the screw coupling 3 by the bearing nut 11. As a result, the bearing portions 9, 10 are provided with predetermined pre-loads, and the load cell 4 is made rotatable relative to the screw coupling 3. In this case, the pre-loads are applied only to the inner tubular portion 5 of the load cell 4, not on the intermediate distortion portion 7 which detects pressures.

Further, the outer tubular portion 6 of the load cell 4 is secured only to the guide coupling 2, thereby not creating a force for securing the outer tubular portion 6 to act on the intermediate distortion portion 7. As a result, the screw pressure is applied to the inner tubular portion 5 through both the screw coupling 3 displacing relative to the guide coupling 2 and the bearing portion 9, while the outer tubular portion 6 is position-regulated by the guide coupling 2. As a result, distortion corresponding to the pressure is generated at the intermediate distortion portion 7, and is detected by distortion gages mounted on the intermediate distortion portion 7. Additionally, the output of the distortion gages, being unaffected by the pre-loads or the guide coupling 2, is proportional to the screw pressure.

DETAILED DESCRIPTION OF THE PREFERRED EMBODIMENTS

Figure 3:
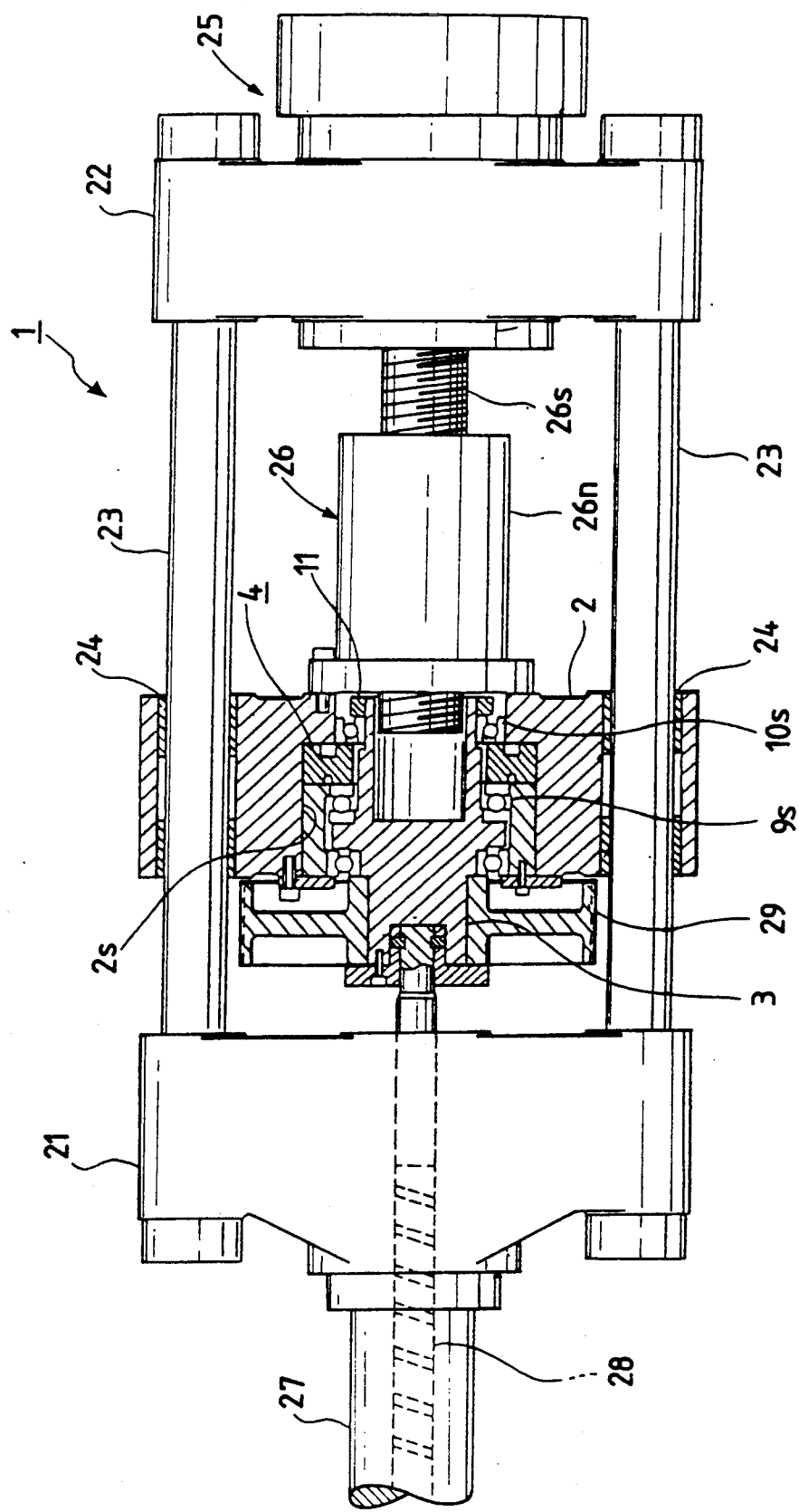
FIG. 3 is a sectional side view of the entire injection molding machine according to the invention.

Prior to a detailed discussion of the invention and referring to FIG. 3, a schematic general construction of the overall inventive injection molding machine will be described hereinunder. An injection molding machine 1, in which a part of a screw drive mechanism and its peripheral portion are particularly shown, includes an injection stand 21 and an injection drive stand 22 which is disposed behind the injection stand 21. Between the injection stand 21 and the injection drive stand 22 are a plurality of guide shafts 23. A guide coupling 2 is slidably installed to the guide shafts 23 through guide bushes 24. The injection drive stand 22 has a drive mechanism 25 including a servo motor which is coupled to a ball screw 26s of a ball screw mechanism 26. A ball nut 26n of the ball screw mechanism 26 is coupled to the guide coupling 2. With this arrangement, linear movements for injection can be transmitted to the guide coupling 2.

The injection stand 21 includes a heated tube 27 and a screw 28 which is inserted into the heated tube 27, and a rear end of the screw 28 is coupled to the screw coupling 3. Screw coupling 3 is supported rotatably inside a support hole 2s which is arranged to pass through the guide coupling 2, and receives rotary movements for measurement through a transmission pulley 29 secured integrally with the screw coupling 3.

Figure 1:
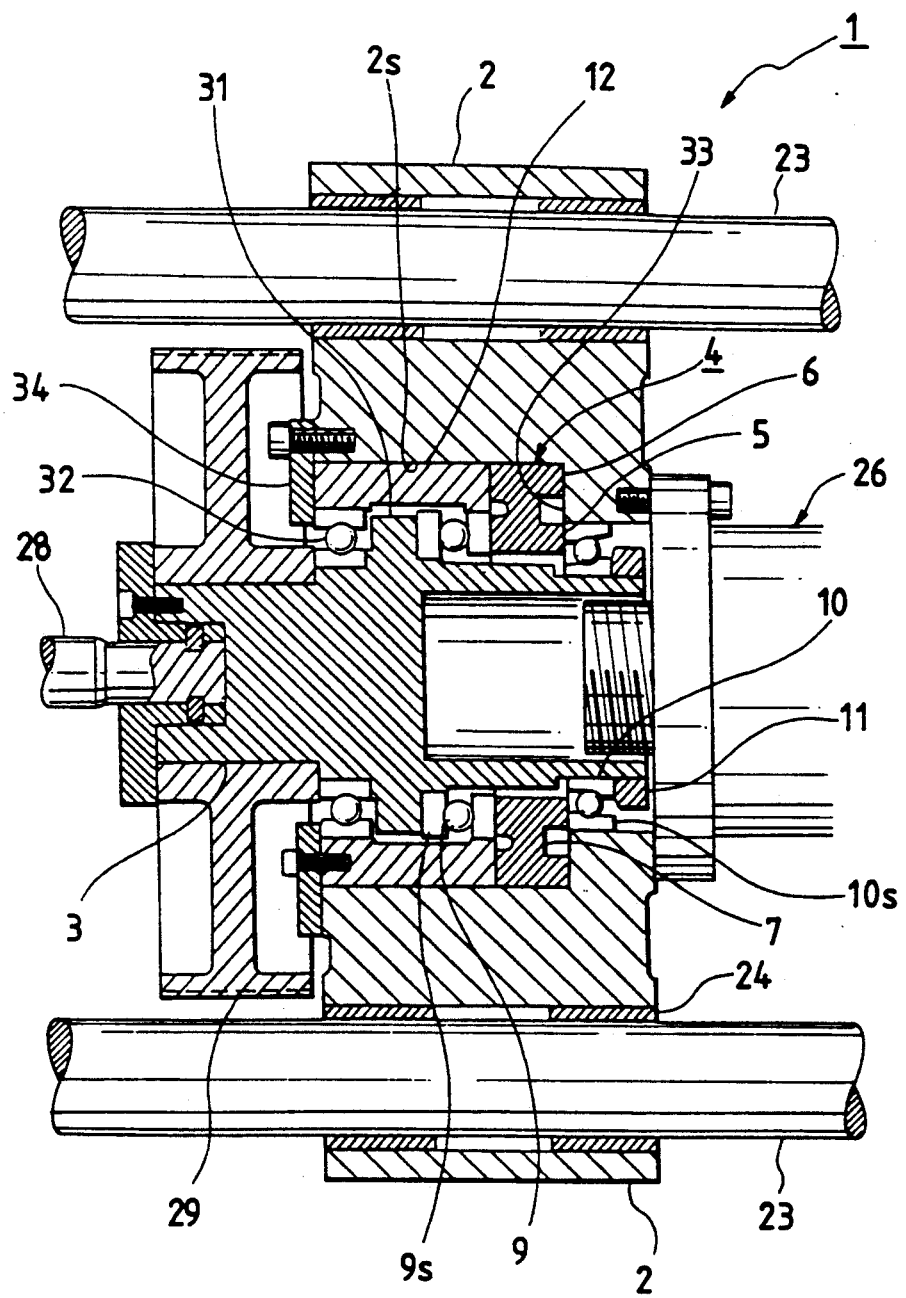
FIG. 1 is a sectional side view showing a main portion of an injection molding machine according to the invention.

Referring to FIG. 1, the construction of a main portion of the machine will be described hereinafter. A load cell (pressure detector) 4, shown in greater detail in FIGS. 4-5, includes the inner tubular portion 5 and the outer tubular portion 6 which are both comparatively thick, and an intermediate distortion portion 7 which is comparatively thin. These components are formed integrally into a washer-type load cell 4. A plurality of distortion gages 7s are positioned in the intermediate distortion portion 7. The inner tubular portion and the outer tubular portion of the load cell can be stepped relative to each other in the axial direction. However, the load cell 4 of this embodiment has no such steps, but instead has both side surfaces cut flat to be parallel so that the manufacture and parallelism thereof can be improved.

The load cell 4 is disposed between the screw coupling 3 and the guide coupling 2. A radially outwardly protruding stopper 31 is arranged in the middle of the outer peripheral portion of the screw coupling 3. A thrust bearing 9s, the inner tubular portion 5 of the load cell 4, and an angular ball bearing 10s are positioned in this order behind the stopper 31. These components are secured to the screw coupling 3 by a bearing nut 11 screwed to the rear portion of the screw coupling 3. The inner tubular portion 5 abuts against the housing washer portion of the angular ball bearing 10s, while the bearing nut 11 abuts against the shaft washer portion of the bearing 10s. A bearing 32 is positioned in front of the stopper 31.

A stopper surface 33 is formed by arranging a stepped portion inside the support hole 2s of the guide coupling 2, and the outer tubular portion 6 of the load cell 4 is secured by being clamped between the stopper surface 33 and the bearing case 12 inserted from the front end of the guide coupling 2. Bearing case 12 secures the bearing 32 and the thrust bearing 9s, and is held by a fixing plate 34 mounted on an end surface of the guide coupling 2 when it is installed. Thus, the bearing case 12 is formed to protrude slightly more outwardly in the axial direction than the end surface of the guide coupling 2, so that the outer tubular portion 6 can be biased thereby.

The operation of the above-described embodiment and functions of the respective parts will be described hereinafter. When the bearing nut 11 is tightened, a predetermined pre-load is applied to the bearings 9s, 10s, and the inner tubular portion 5 of the load cell 4 is rotatably fixed to the screw coupling 3. In this case, the pre-load does not affect the intermediate distortion portion 7 which detects pressures.

The outer tubular portion 6 of the load cell 4 is secured only to the guide coupling 2, so that the force for securing the outer tubular portion 6 does not affect the intermediate distortion portion 7. As a result, pressure from the screw 28 is applied to the inner tubular portion 5 through the screw coupling 3 displacing relative to the guide coupling 2 and the thrust bearing 9s, while the outer tubular portion 6 is position-regulated by the guide coupling 2. This causes a distortion corresponding to the pressure to be generated at the intermediate distortion portion 7. The generated distortion is detected by the distortion gages 7s mounted on the intermediate distortion portion 7. The output of the distortion gages 7s being unaffected by the pre-loads or the guide coupling 2, is proportional to the pressure from the screw 28.

Figure 2:
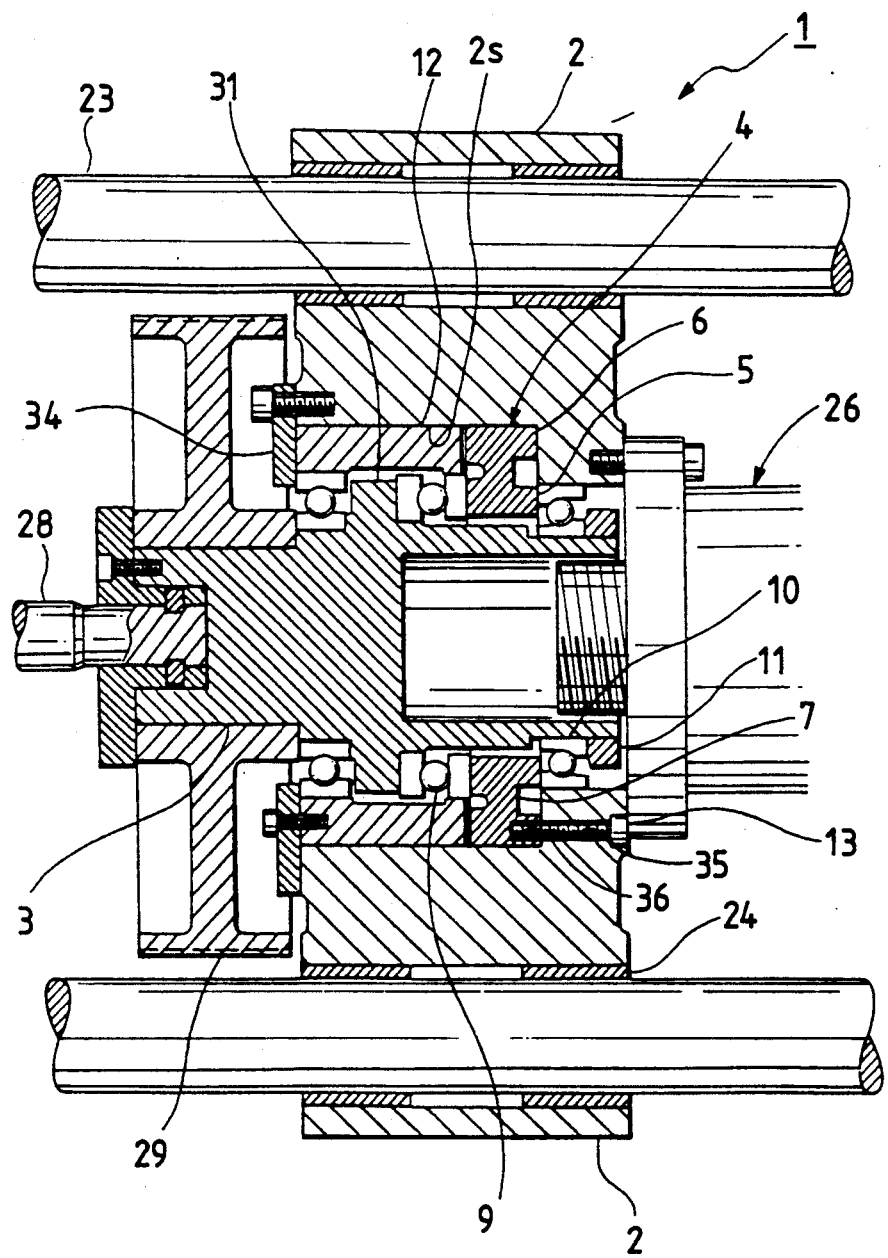
FIG. 2 is a sectional side view showing a main portion of a modified embodiment of the injection molding machine according to the invention.
Figure 4:
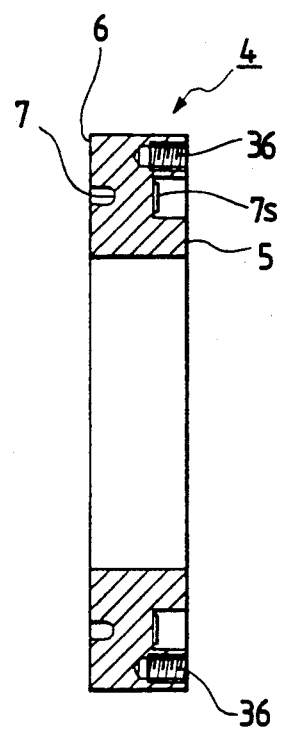
FIG. 4 is a sectional side view showing a load cell to be used in the injection molding machine according to the invention.
Figure 5:
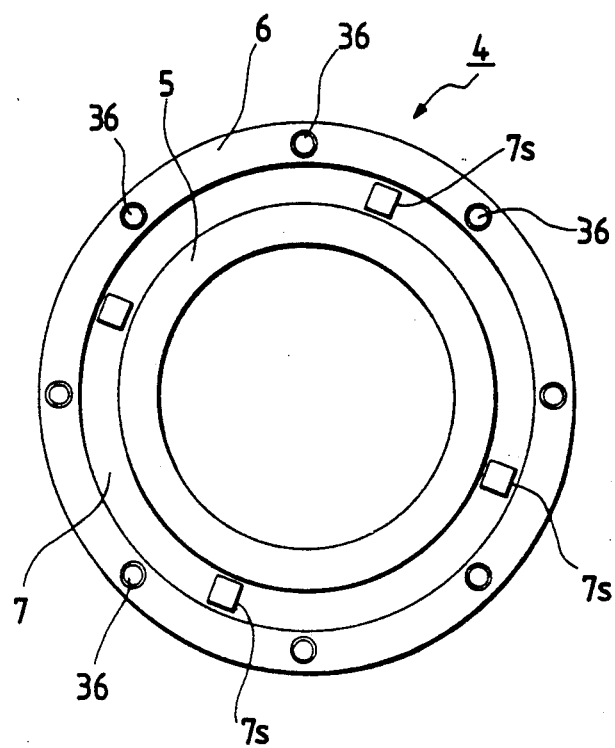
FIG. 5 is a rear view of the load cell shown in FIG. 4.
Figure 6:
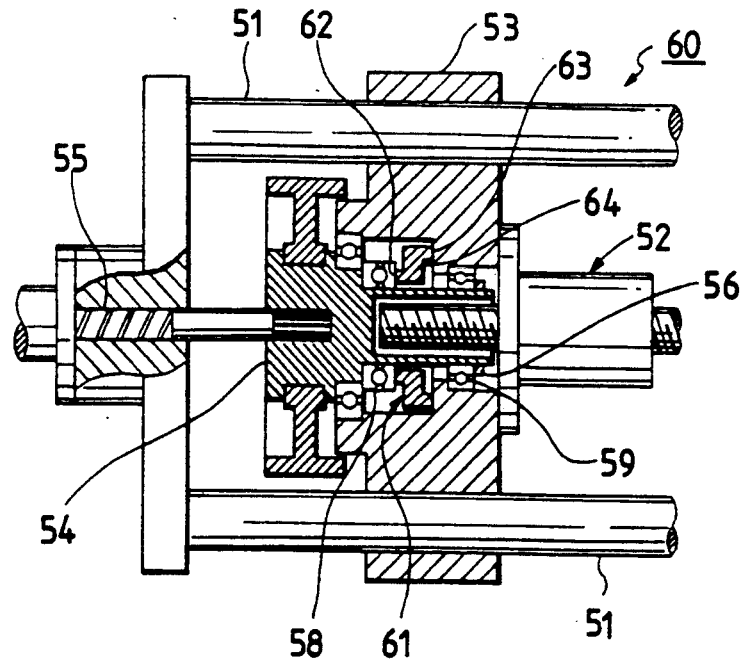
FIGS. 6 and 7 are sectional side views illustrating the principle of a conventional injection molding machine.
Figure 7:
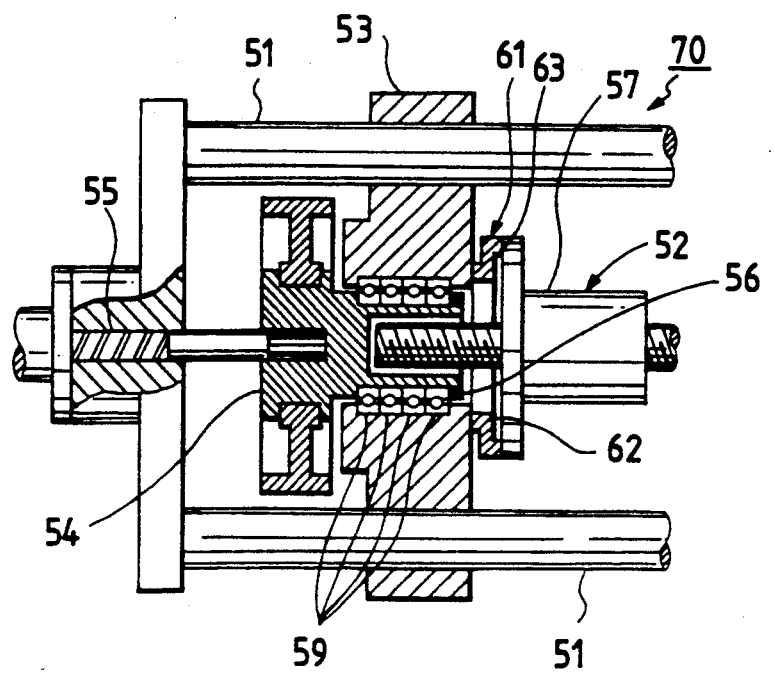

Referring to FIG. 2, a modified embodiment of the injection molding machine 1 will be described hereinafter, and is distinguished from the above-described embodiment by the outer tubular portion 6 being secured to the guide coupling 2 by mounting screws 13. That is, insertion holes 35 for the mounting screws are disposed on the guide coupling 2, and as shown in FIG. 4, mounting screw holes 36 are disposed on the outer tubular portion 6 with the mounting screws 13 inserted therein. Since the modified embodiment has the mounting screw holes 36 on the load cell 4, the load cell 4 is compact, and unlike the embodiment shown in FIG. 1, no consideration need be given to the dimensional accuracy in assembling the bearing case 12. Other aspects of the construction of the modified embodiment are the same as those of the embodiment shown in FIG. 1, and thus, the parts and components in FIG. 2 identical to those shown in FIG. 1 are designated by the same reference numerals to clarify the construction of the modified embodiment and their description is omitted.

As described above, the inventive injection molding machine has the load cell configured to have the inner tubular portion and the pair of bearing portions disposed at both sides of the inner tubular portion secured to the screw coupling by the bearing nut, and the outer tubular portion secured to a guide coupling. As a result of this arrangement, the following advantages can be obtained.

(1) Since neither the pre-loads applied by the tightening of the bearing nut nor the guide coupling affects the detection of pressures, the detection accuracy and reliability can be improved over the conventional systems.

(2) Since neither highly accurate management of pre-loads nor highly accurate machining and assembly of the guide coupling, the injection stand, the injection drive stand, the guide shaft, and the like are required, parts fabrication and assembly thereof can be made easy with the invention over that encountered in the conventional systems.

The invention may be embodied in other specific forms without departing from the spirit or essential characteristics thereof. Therefore, the present embodiment is to be considered in all respects as illustrative and not restrictive, with the scope of the invention being represented by the appended claims rather than by the foregoing description. As such, all changes which come within the meaning and range of equivalency of the claims are intended to be embraced therein.

What is claimed is:

1. An injection molding machine for use with a ball screw mechanism, comprising:
   guide coupling means for providing linear movement to said ball screw mechanism;
   screw coupling means for providing rotary movement to a screw;
   an annular load cell including an inner tubular portion having first and second ends, an outer tubular portion, and an intermediate distortion portion, said load cell being positioned between said guide coupling means and said screw coupling means to detect pressure applied to said screw coupling means; and
   first and second bearing portions positioned at said first and second ends, respectively, of said inner tubular portion of said load cell,
   wherein said inner tubular portion of said load cell and said first and second bearing portions are secured to said screw coupling means to provide said first and second bearing portions with a predetermined load, said predetermined load being applied only to said inner tubular portion of said load cell, said load cell being rotatably fixed to said screw coupling means, and said predetermined load having no affect on said intermediate distortion portion, and
   wherein said outer tubular portion of said load cell is secured only to said guide coupling means.

2. An injection molding machine according to claim 1, wherein said first bearing portion positioned between said inner tubular portion and said screw coupling means comprises a thrust bearing.

3. An injection molding machine according to claim 1, wherein said inner tubular portion of said load cell and said first and second bearing portions are secured to said screw coupling means by a bearing nut, said second bearing portion being positioned between said inner tubular portion and said bearing nut and comprising an angular ball bearing.

4. An injection molding machine according to claim 1, further comprising a bearing case coupled to said first bearing portion, wherein said outer tubular portion is secured to said guide coupling means by being clamped between said bearing case and said guide coupling means, said bearing case securing said first bearing portion positioned between the inner tubular portion and said screw coupling means.

5. An injection molding machine according to claim 1, wherein said outer tubular portion is secured to said guide coupling means by mounting screws.

6. An injection molding machine according to claim 1, further comprising distortion gage means positioned in said intermediate distortion portion for detecting pressure applied to said screw coupling means.

7. An injection molding machine according to claim 1, wherein said inner and outer tubular portions of said load cell have side surfaces cut flat to be made parallel to each other.

8. An injection molding machine according to claim 1, wherein said inner and outer tubular portions of said load cell are stepped relative to each other in an axial direction thereof.

9. An injection molding machine according to claim 4, wherein said bearing case is held by a fixing plate mounted on an end surface of said guide coupling means.

10. An injection molding machine according to claim 4, wherein said bearing case protrudes slightly outwardly in an axial direction of an end surface of said guide coupling means, thereby to bias said outer tubular portion.

11. An injection molding machine according to claim 3, wherein said bearing nut applied said predetermined load to said first and second bearing portions.

12. An injection molding machine according to claim 1, wherein said outer tubular portion of said load cell is exclusively secured to said guide coupling means such that a force for securing said outer tubular portion does not affect said intermediate distortion portion.

13. An injection molding machine according to claim 5, further comprising insertion holes formed in said guide coupling means for said mounting screws and mounting screw holes are formed in said outer tubular portion of said load cell, wherein said mounting screws are inserted into said mounting screw holes.

14. An injection molding machine according to claim 1, wherein said load cell is rotatable relative to said screw coupling means.

* * * * *